United States Patent
Pasco et al.

[15] 3,634,993
[45] Jan. 18, 1972

[54] BOTTOM PLATEN APPARATUS FOR FORMING SKIN PACKAGING

[72] Inventors: William R. Pasco, Milton Township, Morris County; Robert O. Wolfelsperger, Fairfield, both of N.J.

[73] Assignee: William E. Young, Stamford, Conn.

[22] Filed: May 6, 1970

[21] Appl. No.: 35,085

[52] U.S. Cl. .................................. 53/22 A, 53/86, 53/112 A
[51] Int. Cl. ........................................................ B65b 31/02
[58] Field of Search ............................... 53/22 A, 112 A, 86

[56] References Cited

UNITED STATES PATENTS

| | | | |
|---|---|---|---|
| 3,260,032 | 7/1966 | Hill et al. | 53/112 A |
| 3,491,504 | 1/1970 | Young et al. | 53/22 A |

Primary Examiner—Travis S. McGehee
Attorney—Ralph R. Roberts

[57] ABSTRACT

Apparatus for forming a skin package is adapted to press both upper and lower film members tightly around a product usually or often irregular in shape and often having voids therein. In the forming of such a package, it is desirable that during the forming the bottom film be urged away from the bottom platen and formed snugly or tightly around the product and into a sealed condition with the upper film. To form the bottom film of this package in this manner the bottom platen of this invention is made with means for both supporting and heating the bottom film. Adjacent to the product supporting portion of this lower platen there is provided a conductor for pressurized air and the like, said conductor having its discharge end disposed to impinge the underside of the heated lower film so that the flow of air will lift the lower film which forms the other portion of the package.

9 Claims, 4 Drawing Figures

PATENTED JAN 18 1972 3,634,993

INVENTORS
WILLIAM R. PASCO
ROBERT O. WOLFELSPERGER
BY Ralph R. Roberts
AGENT

BOTTOM PLATEN APPARATUS FOR FORMING SKIN PACKAGING

CROSS-REFERENCE TO RELATED PATENT

This invention pertains in particular to an improvement or modification of the apparatus for "Vacuum Skin Packaging," as shown in U.S. Pat. No. 3,491,504, which issued Jan. 27, 1970 to W. E. Young et al., and is assigned to the same William E. Young.

BACKGROUND OF THE INVENTION

1. Field of the Invention

With reference to the classification of art as established in the United States Patent Office, the art to which the present invention pertains is found generally in the class entitled, "PACKAGE MAKING," and more particularly in the subclass identified as "contents, material, treating with vacuum or inert atmosphere," and also in the subclass of "methods with receptacle formed and subsequently filled." and also in the subclass of "methods with receptacle formed and subsequently filled."

2. Description of the Prior Art

In U.S. Pat. No. 3,491,504 which issued Jan. 27, 1970 to W. E. Young et al. there is shown a method and apparatus for vacuum skin packaging. Another apparatus for skin packaging is shown in U.S. Pat. application, Ser. No. 856,305 filed Sept. 9, 1969 by Robert O. Wolfelsperger. In both these inventions and in others of like classification there are disclosed methods of forming a vacuum skin packaging in which the upper and lower films are caused to be sealed around a product which may be generally of irregular shape and size. In particular, many products such as meat, which are to be packaged in film have voids or an irregular bottom surface. In packaging these products lay upon the lower film member of the package as the package is formed. This lower film is usually supported by a substantially flat lower or bottom platen which makes it difficult if not impossible to satisfactorily package the product when it is desired to tightly form this bottom film member to the product. With frozen meat this difficulty often occurs in the disclosed apparatus as shown and described in the above patent. In particular, where the product to be packaged is meat, and wherein the regulations pertaining to its sale requires that the package clearly reveal all surfaces of the product to the view of the customer, it is desirable that the film forming the bottom member portion of the package also tightly cling or remain in contact with the packaged product. Transparent film which is tightly adhered to the product provides a package in which the product may be readily viewed by the prospective customer. The upper film in the packaged product is draped over the product in the forming of the package, then is urged tightly to and around the product. To enable the bottom film to also be tightly pressed against the product during and after the package forming, this invention includes a platen in which locally heating of the bottom film is provided at an intermediate heated area of the bottom platen. To cause this heated film to be lifted from the platen surface when and as the package is made, there is provided a blast or burst of air to the underside of the film to cause it to be lifted from the platen.

SUMMARY OF THE INVENTION

The present invention may be summarized at least in part with reference to its objects.

It is an object of the present invention to provide, and it does provide, a bottom platen which is reciprocably movable within a vacuum chamber in which a vacuum skin package is formed. This bottom platen has a heated intermediate portion which also provides and includes a passageway in which atmospheric pressurized air is fed to the undersurface of a heated lower film member carried on this platen and forming the bottom member of the vacuum skin package.

It is a further object of the present invention to provide, and it does provide, a bottom platen which is reciprocable within a vacuum chamber, said bottom support platen having an intermediate portion which is locally heated to a determined temperature so as to soften the lower film member of a vacuum skin package formed from two films. This movable lower platen has its peripheral portion cooled to retain the film at a temperature below heat sealing condition. This movable platen further having an air passageway formed in the platen, so as to provide for a flow of atmospheric or pressurized air to the underside of the heated bottom film when the package is to be formed, said flow enabling the bottom film to be lifted from the heated bottom platen and forced into sealing engagement with an upper film which is also formed around the product and into a heat-sealing condition with the heated lower film.

INTENT OF THE DISCLOSURE

Although the following disclosure offered for public dissemination is detailed to insure adequacy and aid in an understanding of the invention, this is not intended to prejudice that purpose of a patent which is to cover each new inventive concept therein no matter how it may later be disguised by variations in form or additions of further improvements. The claims at the end hereof are intended as the chief aid toward this purpose, as it is these that meet the requirement of pointing out the improvements in which the inventive concepts are found.

There has been chosen a specific embodiment of the movable lower platen as adopted for use in a vacuum chamber for forming a vacuum skin package. This specific embodiment has been chosen for the purposes of illustration and description as shown in the accompanying drawing wherein:

BRIEF DESCRIPTION OF THE DRAWINGS

In the following description and in the claims various details are identified by specific names for convenience; these names, however, are intended to be generic in their application. Corresponding reference characters refer to like members throughout the several figures of the drawing.

Figure 1:
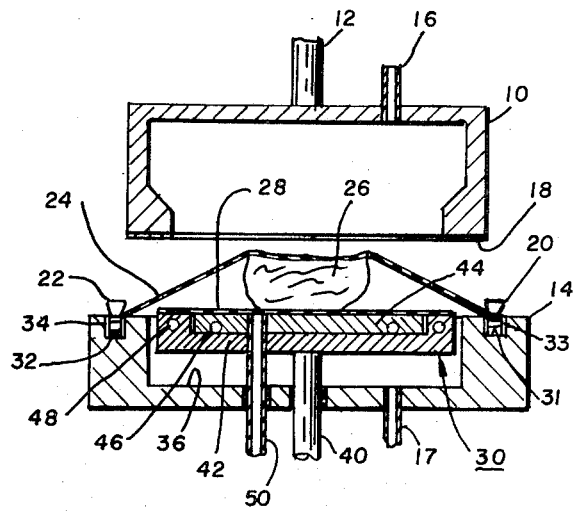
FIG. 1 represents a sectional view of a two-piece vacuum chamber in an open condition and in which a movable lower platen is reciprocated to upper and lower limits of movement, this lower platen has an air conducting passageway terminating at the top surface of the intermediate portion of the lower platen.

The drawing accompanying, and forming part of, this specification discloses certain details of construction for the purpose of explanation of the broader aspects of the invention, but it should be understood that structural details may be modified in various respects.

DESCRIPTION OF THE PREFERRED EMBODIMENT OF FIGS. 1 THROUGH 4

Referring now in particular to the drawing and FIGS. 1 through 4 and the two-piece vacuum chamber and the lower platen as seen therein, it is to be noted that this vacuum chamber includes an upper movable housing member 10, whose cross-sectional configuration may be either round or rectangular. This upper housing member 10 is formed with a closed top so that it is open only at its lower surface. This upper member is carried by and vertically cycled by a rod 12 which may be a piston rod or a component arm of another mechanism providing an up and down movement to this member of the package-forming apparatus.

A lower chamber portion may be fixedly supported by support means not shown or the lower chamber portion 14 may be movable in a determined plane and may be one of several chamber portions carried by an endless roller chain and the like When mounted in a fixed position, the chamber may provide a hand-packaging apparatus for vacuum skin packaging of the product. In other arrangements, conveying means may be used to transport the film and product to be hereinafter more fully described. The lower chamber portion 14 is adapted to provide an outer or upper mating surface disposed to engage the lower rim or face of upper chamber portion 10 when these two are brought to a closed condition. A conductor 16 is mounted in the top wall of the upper chamber to provide a communication means from the inside to the outside of the upper chamber. The interior of the closed chamber may be brought to a condition of reduced pressure by opening conductor 16 to a source of vacuum not shown. This conductor is movable with the upper member 10. In like manner a lower conductor 17 is provided in the lower chamber portion 14, and it also may be opened to a source of vacuum. A gasket 18, provided on the lower surface or face of the upper member 10, is disposed to accommodate any irregularities of surface or film thickness when the upper and lower chambers are brought together to form a closed chamber. Belts 20 and 22 may be V-belts and are contemplated as being movable with a strip of film 24, and are disposed to engage this strip of upper film to transport the film into a determined relationship with the lower chamber 14, after and when a product 26 has been placed upon a lower film 28 carried by a lower platen 30.

Grooves 31 and 32 may be formed in the longitudinal side portions of the lower chamber 14 and are sized to slidably engage and retain chains 33 and 34 which are movable therethrough and are disposed so as to be complimentary to the belts 20 and 22 to engage and transport the upper film 24 as it is brought to the chamber. Roller chains 33 and 34 are slidably carried in these grooves and are intended to provide the lower support members for the upper film 24 transporting apparatus. A recess 36 is formed in the lower chamber portion 14 so as to permit the platen 30 to be reciprocated up and down at the desired frequency and extent desired. The platen 30 is carried by and is reciprocated by means of a rod 40 to upper and lower limits of motion as determined by the operation required to form the vacuum skin package. A main support member 12 of the platen 30 is recessed at its upper intermediate portion to receive a heated platen portion or member 44. This platen portion 42 may have electrical conductors 46 or other heating means disposed throughout so as to bring this intermediate portion 44 to a determined temperature whereby to heat the lower film 28 to a desired or selected temperature.

The peripheral portion of the main member 42 may be locally cooled by means of water and the like. This cooling means is carried in conductors 48 around the outer portions of the movable platen 30 so as to provide cooling to the outer edges of the lower film 28. This cooling enables the outer edges of the film 28 adjacent the walls of the chamber to be maintained in a cooled condition below the heat sealing temperature of either the lower or upper film. Also carried by the lower platen is an air or gas conductor 50, which is controlled by an "ON-OFF" valve so as to be open to vacuum, atmospheric air, or to pressurized air, as may be desired or determined by the operator of the process in the forming of the package.

Figure 2:
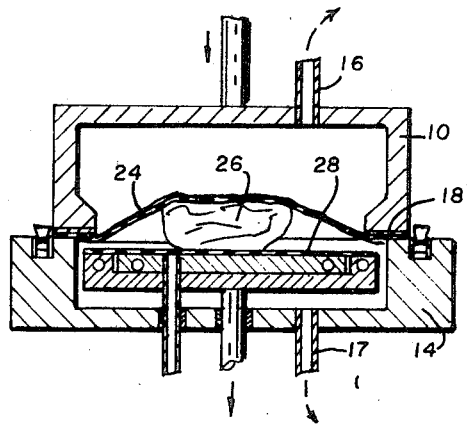
FIG. 2 represents a sectional view of the vacuum chamber of FIG. 1 in a closed condition, and with the movable platen lowered to permit conditioning of the chamber for reduced pressure and perhaps for heating the lower film.

Referring now to FIG. 2, it is to be noted that the product 26 is shown as placed upon the lower film 28 and subsequently covered by the upper film 24. The upper chamber portion 10 has been moved to a closed condition and in so doing has pushed the upper film 24 toward or into engagement with the upper surface of the bottom chamber 14, so that the upper film 24 is clamped in a determined and usually taut condition between the gasket 18 and the lower chamber 24. This upper film 24 may have been heated just prior to its being brought in way of the upper chamber member 10 or it may be heated by a means of heating conductors not shown located within the upper chamber member 10. The lower platen 30 has been lowered to a position below the top surface of the lower chamber 14. The position of the lower platen in the chamber is merely a matter of selection. For example, the platen may be brought to a position above the lower chamber for loading, whereat the lower film 28 is first positioned and placed on the upper surface of the platen. The product 26 is then placed on the lower film after which the platen is lowered to a desired position in the lower chamber which may be the lowest condition. The upper film 24 is then drawn across the lower chamber and product after which the upper chamber is brought toward and to the lower chamber to close the chamber. As it lays on the platen the lower film 28 is locally heated as desired and for a determined period of time. At or about the same time, conductors 16 and 17 are opened to a source of vacuum to cause the closed chamber to be brought to a condition of reduced pressure. As the area between the films is also open to the conductor 17, the product and the area between the upper and lower films 24 and 28 is also brought to a condition substantially equal to the desired reduced pressure of the lower chamber. When the determined reduced pressure level is achieved in both the product and in the chamber the lower platen is moved upwardly to the condition of FIG. 3.

Figure 3:
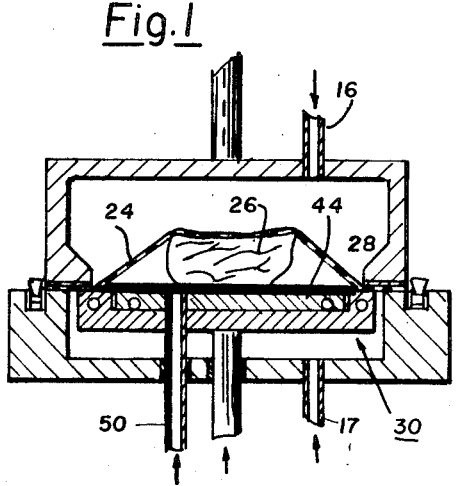
FIG. 3 represents a sectional view of the closed chamber of FIG. 2, but with the lower platen raised into clamping condition of the upper and lower films prior to the final forming of the package.
Figure 4:
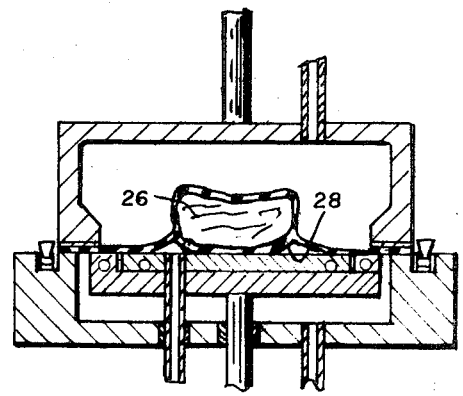
FIG. 4 represents a sectional view of the chamber of FIG. 3 with the upper and lower films tightly adhered around the product, and with the package formed in the desired manner of a vacuum skin package.

Referring next to FIG. 3, it is to be noted that the lower platen 30 as it is lifted brings the lower film 28 into engagement with the upper film 24 forming a chamber of reduced pressure between the films. As the bottom platen is raised it pushes the product into the draped upper film causing this upper film to be further brought to and around the product 26. At this time, the vacuum to the conductors 16 and 17 is shut off and atmospheric or pressurized air is permitted or caused to enter the upper chamber through conductor 16, and to the lower side of the warmed portion of the bottom film through the conductor 50. As the air leaves the conductor 50, it causes the lower film 28 to be lifted from the surface of heated portion 44. The external air pressure and the vacuum in the formed package provides a differential causing the upper and lower films to move to and around the product to tightly engage all sides of the product 26 as seen in FIG. 4. After forming the package the closed chamber is vented to atmosphere through conductors 16 and 17 prior to the opening of the chamber to remove the packaged product 26.

USE AND OPERATION OF THE CHAMBER AND PLATEN OF FIGS. 1 THROUGH 4

As shown and above-described it is noted that at the time the lower film and product are placed on the lower platen 30 it preferably is brought to a position at the same level l or slightly above the upper surface of the lower chamber portion 14. The lower film member 28 is then placed upon this lower platen 30 after which the product piece 26 is placed upon this platen so that both film and product lay on the heated portion 44. This product piece may be fresh meat in a frozen condition, or may be other products such as fish, fowl, fruit, vegetables and the like. It is only necessary that the product to be packaged occupy an intermediate portion of the lower film and that at least a substantial portion of the heated film be exterior of the product so that the heated film may be urged upwardly and into a heat-sealing condition with the upper film at a point substantially midway of the upper and lower surface of the product.

After the lower film and product are positioned on the lower platen it is lowered so that the upper film 24 may be advanced as by means of belts 20 and 22 as they engage the film between chains 33 and 34 slidably carried in guideways 31 and 32 in the lower chamber portion 14. This upper film is drawn over the product 26 and may be either heated prior to its being brought in way of the upper chamber portion 10, by heating means not shown, or by heating means in the upper chamber also not shown. Whether the lower chamber and the lower platen are transported or movable by means of roller chains or by other advancing means, or whether the chamber be fixed in space and operated with both films and product being brought to the chamber, it is necessary that the upper and lower chamber portions be brought into an aligned relationship. After alignment the upper chamber 10 is caused to be moved downwardly by means of an air cylinder or the like moving the shaft 12 downwardly to cause the upper chamber to push the upper film 24 to and into the clamped condition with the lower chamber 14 as in FIG. 2. When the upper chamber is in a clamped condition with the lower chamber it becomes a closed chamber which is sealed except for conductors 16, 17 and 50. With the lower platen below the upper surface of the lower chamber the conductors 16 and 17 are opened to a source of vacuum or reduced pressure so that the inner chamber is brought to a condition of reduced pressure including the product 26 and the area between the upper and lower films. This condition of reduced pressure in the closed chamber may be 20 inches of mercury or more.

As or after the closed chamber has been brought to a condition of reduced pressure the upper and lower films are, or are caused to be, brought to a warmed condition sufficient for heat sealing to each other. The upper film 24 may have been heated prior to being moved to the chamber and/or may be heated by means within the chamber. The lower film 28 may have been partially warmed prior to being placed on the bottom platen but warmed or not it is warmed to the desired condition by heated portion 44. When the desired reduced pressure in the chamber is reached the vacuum to conductors 16 and 17 is shut off after which the conductors 16 and 50 are opened to atmospheric or low pressure air. The differential of pressure causes the warm upper film 24 to be pushed downwardly around the product and toward the lower platen. At the same time the lower film 28 is caused to be lifted from the surface of the lower heated platen 44 by means of atmospheric or low pressure air entering through conductor 50. This flow of air causes the lower film to be lifted and to be pushed to and tightly around the product 26 and toward the upper film until the product is packaged with the films joining in a heat-sealed condition at substantially midheight of the sides of the packaged product. The atmospheric pressure on the film causes it to be tightly pushed into engagement with substantially all the exterior surfaces of the product as is shown in FIG. 4.

Although the platen above-described is shown in use in a two-piece chamber as described above, the bottom platen may also be used with other reduced-pressure type chambers wherein it is desirable to provide means for lifting the bottom film from the surface of the platen so that it may be urged into tight engagement with the surface of the product and particularly to the bottom surface of the package upon which the product rests as it is packaged.

It is contemplated that in certain instances it may be desirable with certain types of films to locally and/or selectively heat the lower film. This may require that the intermediate portion 44 be further limited as to its heating area. For example, a ringlike heating member could be used in place of intermediate portion 44 with the center portion of the upper platen maintained at a cooler temperature than the ring member. The pattern arrangements of the heated and cooled position of the lower platen is made to accommodate the particular problem of film and product to be packaged. One or more conductors 50 may be provided and small grooves in the upper surface of the lower platen may be provided so long as an adequate supply of air is brought to the undersurface of the lower film to lift the film as it is being formed around the product.

It is further contemplated that in certain instances it may be desirable to treat the product to be packaged with a gas flush at the time it is being packaged. The above shown apparatus is adapted to provide means for producing such a gas flush. After the closed chamber of FIG. 2 has been brought to a condition of reduced pressure such as one-eighth to one-quarter atmosphere, and after or during the time the upper and lower films are brought to a sealing condition, the conductor 17 is closed to the source of vacuum. This conductor 17 is then operatively connected to a supply of the gas which is to be used to flush the product. The pressure of this supply of flushing as is at a greater pressure than the condition of reduced pressure of the chamber just prior to the opening of the conductor 17 to the flushing gas. This pressure differential causes the gas to be drawn into all the chamber which is below the upper film 24. The conductor 16 to the upper chamber is then opened to the atmosphere or to pressurized air slightly above atmospheric pressure. Conductor 17 after the upper film 24 has been moved to the lower film is closed as to the source of gas and both conductor 17 and 50 are opened to atmospheric air or to the same or like pressurized air as is provided through conductor 16. This enables the upper and lower films to be tightly engaged around the product while leaving a small amount of gas trapped in the packaged product. The chamber is then vented and opened in the above-described manner.

It is to be further noted that in addition to the apparatus for transporting the upper film as above-described, other chains and belt systems, or other known film-transporting means such as reciprocating apparatus may be provided. It is only necessary that the upper film be brought over the product and to the periphery of the chamber opening so that when the chamber is closed the upper film is gripped to provide a positive separation barrier of the chamber.

Terms such as "left," "right," "up," "down," "bottom," "top," "front," "back" and the like are applicable to the embodiment shown and described in conjunction with the drawing. These terms have been used merely for the purposes of description and do not necessarily apply to the position in which the bottom platen may be used in the closed chamber.

The conception of the bottom platen and its application in a closed chamber is not limited to the specific embodiment shown but departures therefrom may be made within the scope of the accompanying claims and protection is sought to the broadest extent the prior art allows.

We claim:

1. In an apparatus for vacuum forming a skin package in which a closed chamber provides means for enabling the product which is to be packaged to be brought to a condition of reduced pressure at and during the time the product is being packaged, and in which upper and lower films are used to form the package surrounding the product said apparatus including: (a) a chamber of at least two portions and disposed to be opened for loading and closed for package forming, the closed chamber disposed to by its edges retain a warmed upper film as it is draped over and around the product being packaged; (b) a bottom platen disposed within the chamber and movable within determined limits to provide a loading position and an upper film-covering position; (c) means for heating the upper surface of the bottom platen at a portion intermediate its edges so as to condition the lower film for heat-sealing condition to the upper film; (d) means for cooling the upper surface of the bottom platen at the area peripheral to the heated portion so that the outer portions of the lower film which is supported by the lower platen and is within the chamber is maintained at a temperature which is less than the heat-sealing temperature of either of the films forming the package; (e) means for conducting atmospheric air, pressurized air, gas and the like from outside the closed chamber to at least one discharge point at the heated upper surface of the lower platen, and (f) conductors provided in the upper and lower chamber portions and selectively connected to sources of vacuum, air, gas and the like.

2. Apparatus for forming a skin package as in claim 1 in which the conductor to the lower chamber is selectively connected to a source of gas which is to be used to treat the product by "flushing" at a low determined pressure, the flow from the source of gas being discontinued to the conductor to the lower chamber during the forming and sealing of the upper and lower film around the product.

3. Apparatus for forming a skin package as in claim 1 in which the upper and lower chamber members are maintained in fixed alignment with each other and in which the upper and lower film and product are transported to the chamber and after the chamber is brought to a closed condition the chamber is brought to a reduced pressure after which the film is formed and sealed around the product.

4. The method of forming a vacuum skin package in a chamber which is selectively closed so as to permit the interior of the chamber to be brought to a condition of reduced pressure and in this condition to permit a vacuum skin package to be formed between two films which provide the members forming the surrounding package, said method including the steps for:
 a. opening a chamber comprising of at least two mating parts;
 b. placing a lower film member on a lower platen movable in said chamber.
 c. placing the product to be packaged in said lower film member;
 d. moving an upper film over the product to be packaged and to the periphery of the chamber opening, said upper film being adapted for heat sealing to the bottom member when brought to a warmed condition;
 e. closing the chamber so as to cause the upper film to be gripped by the chamber members to cause the interior of the chamber to be divided by the upper film into upper and lower chambers;
 f. causing the entire interior of the upper and lower chamber portions and the product therein to be brought to a condition of reduced pressure by operatively connecting the upper and lower chamber portions to a source of vacuum;
 g. warming the bottom film in at least a selected area by means of a heating member in the lower platen so as to bring this area to a heat-sealing condition with the upper film;
 h. moving the upper film towards and around the product and towards the lower film by shutting off the operatively connected means from the upper chamber to the vacuum supply and operatively connecting said means to a source of air, gas and the like which is at a pressure at least substantially equal to atmospheric pressure;
 i. lifting the warmed bottom film from the upper surface of the lower platen by means of air, gas and the like which is also at least atmospheric pressure, said air, gas and the like being fed through a conductor so as to discharge at said upper surface of the platen and by its discharge move the lower film from the platen and snugly around the product and toward and to the upper film for heat sealing therewith, and
 j. opening the chamber to permit removal of the now packaged product from the chamber.

5. The method of forming a vacuum skin package as in claim 4 in which all conductors to the interior of the chamber and platen are "vented" to the atmosphere prior to the opening of the chamber to remove the packaged product.

6. The method of forming a vacuum skin package as in claim 4 in which the lower platen is movable to an upper position whereat its support surface is at not less than the top of the lower chamber, and in which it is movable to a lower position whereat the product carried thereon is substantially below the top of the lower chamber.

7. The method of forming a vacuum skin package as in claim 4 in which the heating area of the bottom platen is peripherally surrounded by a cooler area.

8. The method of forming a vacuum skin package as in claim 7 in which the operatively connected means for conducting vacuum, gas and the like from the chamber includes a conductor to the upper chamber and a separate conductor to the lower chamber, and the means for feeding the gas, air and the like to the upper surface of the lower platen is a conductor extending from outside the chamber to a discharge outlet at the top surface of the platen and within the heated area of the platen.

9. The method of forming a vacuum skin package as in claim 4 in which there are separate conductors to those portions of the closed chamber which are above and below the gripped upper film and in which the conductor to that portion of the chamber below the gripped upper film is selectively connected to a source of low pressure gas adapted to treat the product.

* * * * *

PO-1050
(5/69)

UNITED STATES PATENT OFFICE
CERTIFICATE OF CORRECTION

Patent No. 3,634,993         Dated January 18th, 1972

Inventor(s) William R. Pasco - Robert O. Wolfelsperger

It is certified that error appears in the above-identified patent and that said Letters Patent are hereby corrected as shown below:

Col. 1, lines 20 and 21, delete "and also in the subclass of "methods with receptacle formed and subsequently filled."

Col. 3, line 47, change "12" to read -- 42 --;
line 74, change "24" to read -- 14 --.

Col. 4, line 53, delete "1" between "level" and "or";
line 58, after "meat" add --, meat--.

Col. 5, line 61, "taIned" should read -- tained --.

Col. 7, line 19, "in" should read -- on --.

Signed and sealed this 13th day of June 1972.

(SEAL)
Attest:

EDWARD M. FLETCHER, JR.         ROBERT GOTTSCHALK
Attesting Officer                Commissioner of Patents